US012534176B1

(12) United States Patent
Mou et al.

(10) Patent No.: US 12,534,176 B1
(45) Date of Patent: Jan. 27, 2026

(54) FUSELAGE SUB-FLOOR STRUCTURE WITH AIRCRAFT COMPONENTS HAVING CORRUGATED C-CHANNEL

(71) Applicant: Civil Aviation University of China, Tianjin (CN)

(72) Inventors: Haolei Mou, Tianjin (CN); Xingyan Liu, Tianjin (CN); Jiang Xie, Tianjin (CN); Zhenyu Feng, Tianjin (CN)

(73) Assignee: Civil Aviation University of China, Tianjin (CN)

( * ) Notice: Subject to any disclaimer, the term of this patent is extended or adjusted under 35 U.S.C. 154(b) by 0 days.

(21) Appl. No.: 18/900,961

(22) Filed: Sep. 30, 2024

(51) Int. Cl.
*B64C 1/06* (2006.01)

(52) U.S. Cl.
CPC .............. *B64C 1/069* (2013.01); *B64C 1/061* (2013.01)

(58) Field of Classification Search
CPC .... B64C 1/06; B64C 1/061; B64C 1/062; B64C 1/068; B64C 1/069; B64C 1/18
USPC ........................................ 188/376, 371, 377
See application file for complete search history.

(56) References Cited

U.S. PATENT DOCUMENTS

| | | | | |
|---|---|---|---|---|
| 7,874,516 B2 * | 1/2011 | Cacciaguerra | .......... | B64C 1/061 244/119 |
| 8,376,275 B2 * | 2/2013 | Bolukbasi | .......... | B64C 1/062 244/119 |
| 8,814,092 B2 * | 8/2014 | Milliere | .......... | B64C 1/062 244/121 |
| 9,090,331 B2 * | 7/2015 | Fitzsimmons | .......... | B64C 1/06 |
| 9,266,600 B2 * | 2/2016 | Milliere | .......... | B64C 1/062 |
| 2008/0093503 A1 * | 4/2008 | Cacciaguerra | .......... | B64C 1/061 244/119 |
| 2009/0206202 A1 * | 8/2009 | Bolukbasi | .......... | B64C 1/062 244/121 |

FOREIGN PATENT DOCUMENTS

| | | | | |
|---|---|---|---|---|
| CN | 109278978 A | * | 1/2019 | |
| CN | 111392027 A | * | 7/2020 | ............. B64C 1/062 |
| CN | 116495164 A | * | 7/2023 | |
| CN | 118457898 A | * | 8/2024 | ............. B64C 1/068 |
| JP | 2008189126 A | * | 8/2008 | ............. B21D 13/00 |

* cited by examiner

Primary Examiner — Arfan Y. Sinaki
(74) Attorney, Agent, or Firm — Addison D. Ault; IPGentleman Intellectual Property Services, LLC

(57) ABSTRACT

An aircraft fuselage sub-floor structure with an aircraft column component includes an upper fuselage frame, a lower curved fuselage frame, and a corrugated corrugated C-channel component. The upper fuselage frame is integrated with a cargo floor crossbeam, and the upper fuselage frame connects with the lower curved fuselage frame through a splice plate. The lower curved fuselage frame is divided into left and right sections at the bottom, and is strengthened by a doubler at the bottom of the docking. The corrugated C-channel includes an intermediate corrugated section and a straight section arranged at both ends of the intermediate corrugated section. The straight section of the corrugated C-channel is connected to the cargo floor crossbeam and the upper curved fuselage frame through the upper and lower stanchion fitting respectively. The upper and lower stanchion fitting flanges are connected to the flanges on both sides of the straight section.

7 Claims, 4 Drawing Sheets

FUSELAGE SUB-FLOOR STRUCTURE WITH AIRCRAFT COMPONENTS HAVING CORRUGATED C-CHANNEL

TECHNICAL FIELD

The present invention belongs to the technical field of aircraft energy absorption structure, and specifically relates to an aircraft column component and a fuselage sub-floor structure with column components.

BACKGROUND

Crashworthiness refers to the ability to maximize the protection of occupants, reduce the casualties of occupants as much as possible, and enable on-board occupants to successfully evacuate aircraft in the event of a crash or other emergency landing events.

Combined with the typical aircraft fuselage section crash test and the whole aircraft crash test carried out in the world based on the civil aircraft crash accident, the results show that the fuselage sub-floor structure collides with the ground in the event of a crash, and the deformation and failure of the fuselage sub-floor structure can absorb the impact energy generated by the collision, thereby protecting the safety of the occupants. Civil aircraft crash accidents are inevitable, and at the same time more and more passengers are transported on civil aircraft. The higher requirements are put forward for the crashworthiness of civil aircraft fuselage structure to ensure that the civil aircraft can absorb the impact energy and protect the safety of the occupants in the event of a crash. In the existing technology, the column component is arranged between the fuselage frame and the cargo floor crossbeam, and the deformation of the column component is used to fully absorb the impact energy generated by the collision in the event of a crash process, which can improve and enhance the crashworthiness of aircraft.

Most of the existing aircraft fuselage structures adopt open-section thin-walled structures, such as the fuselage sub-floor structure is usually a C-channel structure, and the C-channel structure is generally composed of thin-walled structures of composite materials or aluminum alloys. However, the C-channel structure is prone to failure behaviors such as local buckling or sudden broken when deformed in the event of a crash. When the local area of the C-channel structure is buckled or broken, the C-channel structure will almost lose its load capacity and no longer have the effect of absorbing the impact energy of the crash, resulting in poor energy absorption stability of the C-channel structure, thereby reducing the crashworthiness of the aircraft and the protection effect on the occupant in the event of a crash.

SUMMARY

In view of this, the present invention provides an aircraft column component and a fuselage sub-floor structure with column components, which can stably absorb the impact energy, improve the crashworthiness of the aircraft and the protection effect of the occupant in the event of a crash, so as to solve the shortcomings in the existing technology.

The technical scheme of the present invention is: an aircraft column component, the aircraft column component includes a corrugated C-channel and two upper and lower stanchion fittings, and is configured to connect between a cargo floor crossbeam of an upper fuselage frame of the aircraft and a lower curved fuselage frame. The corrugated C-channel includes an intermediate corrugated section and a straight section arranged at both ends of the corrugated C-channel, the straight section of the corrugated C-channel is integrated with a web plate and a flange of the corrugated section, and the corrugation of the corrugated section is arranged along its length extension direction. The stanchion fitting includes a stanchion fitting main web plate, a stanchion fitting flange and a stanchion fitting secondary web plate, the stanchion fitting main web plate, the stanchion fitting flange and the stanchion fitting secondary web plate are fixedly connected and perpendicular to each other.

Preferably, the stanchion fittings are connected to the inner side of the straight section respectively, the main web plate of the upper stanchion fitting is connected to the cargo floor crossbeam, and the main web plate of the lower stanchion fitting is connected to the lower curved fuselage frame, the stanchion fitting main web plate and the stanchion fitting flange are one-to-one corresponding to the web plate and flange of the straight section of the corrugated C-channel, and the corresponding positions are fixedly connected respectively.

Preferably, a strength of the stanchion fitting is greater than the strength of the corrugated C-channel.

In the aircraft column component, when the corrugated C-channel is compressed, the corrugated section can collapse along its length direction.

An aircraft fuselage sub-floor structure, including: the upper fuselage frame, the lower curved fuselage frame, and an aircraft column component connected between the upper fuselage frame and the lower curved fuselage frame.

Preferably, the upper fuselage frame includes: an upper curved fuselage frame and the cargo floor crossbeam. The upper curved fuselage frame is integrated with the cargo floor crossbeam, and the upper fuselage frame and the lower curved fuselage frame are connected to the aircraft column component through a splice plate.

Preferably, the lower curved fuselage frame is divided into left and right sections at the bottom, and is strengthened by a doubler at the bottom of docking. The doubler is respectively connected to one side of the two sections of the lower curved fuselage frame near a central axis of the aircraft.

Preferably, multiple aircraft fuselage column components are symmetrically arranged on both sides of the central axis of the aircraft, one end of the corrugated C-channel of the aircraft fuselage column components is fixedly connected to the cargo floor crossbeam, and the other end is tilted downward and fixedly connected to the lower curved fuselage frame.

Preferably, an angle range between the corrugated C-channel and the central axis of the aircraft is −20°-20°.

Preferably, a web plate width of the lower curved fuselage frame is smaller than the web plate width of the upper fuselage frame.

Preferably, the splice plate is arranged between the two ends of the lower curved fuselage frame and the cargo floor crossbeam, and the splice plate is respectively detachably and fixedly connected to the lower curved fuselage frame and the cargo floor crossbeam.

Preferably, strength of the splice plate is greater than the strength of the upper fuselage frame.

Compared with the existing technology, the present invention provides an aircraft column component and a fuselage sub-floor structure with column components, by using the corrugated C-channel in combination with the stanchion fitting, the corrugated section of the corrugated C-channel can be collapsed and deformed to absorb energy when the corrugated C-channel is compressed, meanwhile, the stanchion fitting flange on the stanchion fitting can restrict the flanges on both sides of the corrugated C-channel to avoid the flanges twisting when compressed, prevent the instability buckling or broken of the corrugated C-channel, and ensure its stability when compressed, which makes the column components can stably absorb the impact energy, improve the crashworthiness of the aircraft and the protection effect of the occupant in the event of a crash; the column components of the present invention has good buffering effect, high safety and strong practicability, which is worthy of promotion.

DETAILED DESCRIPTION OF THE EMBODIMENTS

The present invention provides an aircraft column component and a fuselage sub-floor structure with column components, the present invention is described below in combination with the structural schematics from FIGS. 1-5.

In the above description of the present invention, it is to be understood that the terms "center", "longitudinal", "transverse", "length", "width", "thickness", "upper", "lower", "front", 'back', 'left', 'right', "vertical", "horizontal", "top", "bottom", "inside", "outside", 'axial', 'radial', 'circumferential', etc. is based on the orientation or positional relationship shown in the accompanying drawings, merely for ease of description and simplification of the description of the present invention, and not to indicate or imply that the referenced device or element must have a particular orientation and be constructed and operative in a particular orientation, and thus may not be construed as a limitation on the present invention.

Figure 1:
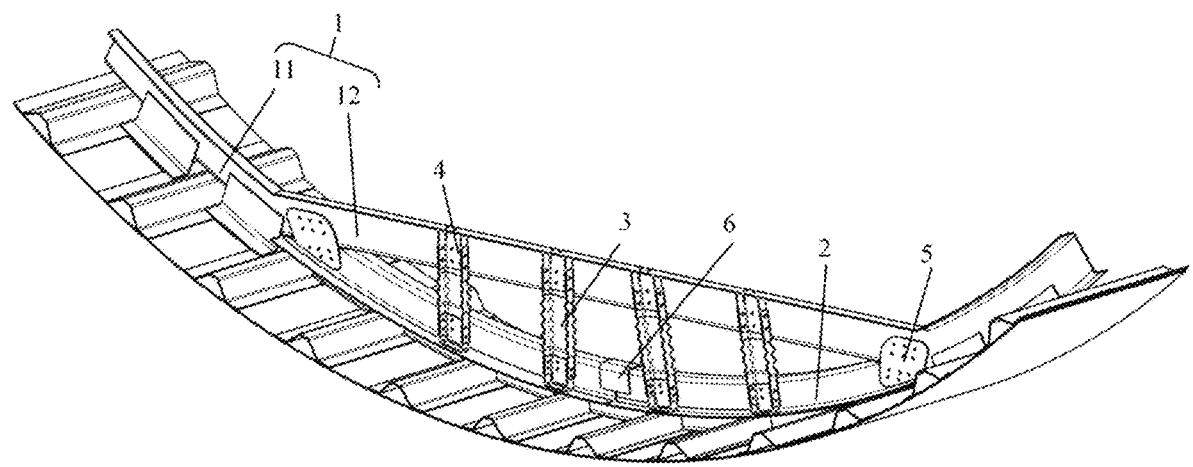
FIG. 1 is a three-dimensional view of a fuselage sub-floor structure with aircraft column components of the present invention.

As shown in the figure, FIG. 1 is a three-dimensional view of an aircraft column component and a fuselage sub-floor structure with column components of the embodiment. The lower structure of the aircraft fuselage is based on the deformation energy absorption, the energy absorption efficiency of the fuselage frame structure can be optimized by setting a relatively weak lower curved fuselage frame 2 and an improved fuselage column component.

In the event of a crash, the impact load first acts on a skin of the lower part of the fuselage, and the skin and a stringer transmit the impact load to the lower curved fuselage frame 2 through a shear tie. Because the structural strength of the lower curved fuselage frame 2 is slightly weaker, the docking of the lower curved fuselage frame 2 and the doubler 6 absorb energy to form a plastic hinge, which is bent to the cabin, and compresses the corrugated C-channel 3 with the cargo floor crossbeam 12 which is slightly higher strength. Then, the corrugated C-channel 3 is guided by the stanchion fitting 4, so that the web plate and flange of the corrugated C-channel 3 are uniformly loaded, and the corrugated section 31 undergoes progressive collapse. At the same time, the remaining impact load is transferred to the upper structure of the fuselage along the splice plate 5 and the upper fuselage frame 1.

The present invention can ensure that the lower frame is under the action of crash impact load, the lower curved fuselage frame 2 is prone to plastic deformation, and the corrugated C-channel 3 is prone to stable progressive collapse, and the stanchion fitting 4 restricts the flange of the corrugated C-channel 3 to further ensure the stability of the corrugated C-channel under compression, so that the fuselage sub-floor structure can absorb the impact energy of the crash to the maximum extent, thereby improving the crashworthiness of the aircraft and the protection effect of the occupant in the event of a crash.

Figure 2:
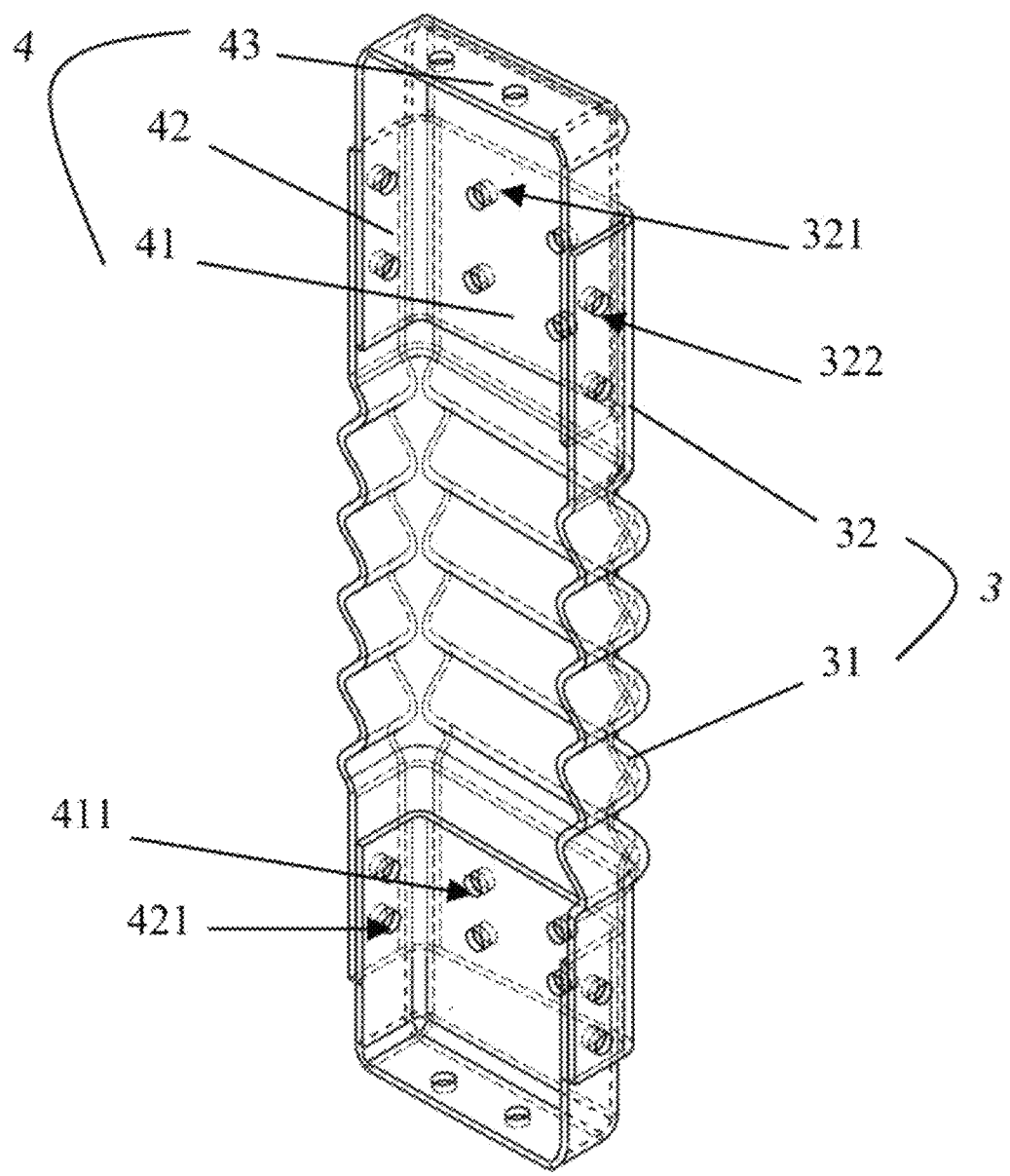
FIG. 2 is a schematic diagram of aircraft column components of the present invention.

FIG. 2 is a schematic diagram of the aircraft column components of the embodiment, the aircraft column component includes a corrugated C-channel 3 and two upper and lower stanchion fittings 4. One end of the aircraft column components is fixedly connected to the cargo floor crossbeam 12, and the other end is tilted downward and fixedly connected to the lower curved fuselage frame 2.

In the embodiment, the aircraft column component is fixedly connected to the web plate of the cargo floor crossbeam 12 and the web plate of the lower curved fuselage frame 2 by bolts respectively. Wherein, multiple first bolt holes 411 are arranged on the stanchion fitting main web plate 41, and multiple second bolt holes 321 are arranged on the web plate of the straight section 32 at both ends of the corrugated C-channel 3, the first bolt hole corresponds to the second bolt hole one by one.

As a further optimization scheme, in the disclosed embodiment, multiple third bolt holes 421 are arranged on the stanchion fitting flange 42, and multiple fourth bolt holes 322 are arranged on the flange of the straight section 32 at both ends of the corrugated C-channel 3, the positions of the third bolt hole 421 and the fourth bolt hole 322 correspond to each other and are fixedly connected by bolts respectively, which can avoid the instability and bending of the column components due to the large torsion of the flange of the corrugated C-channel 3 in the event of a crash, and ensure the load capacity of the column components.

Figure 3:
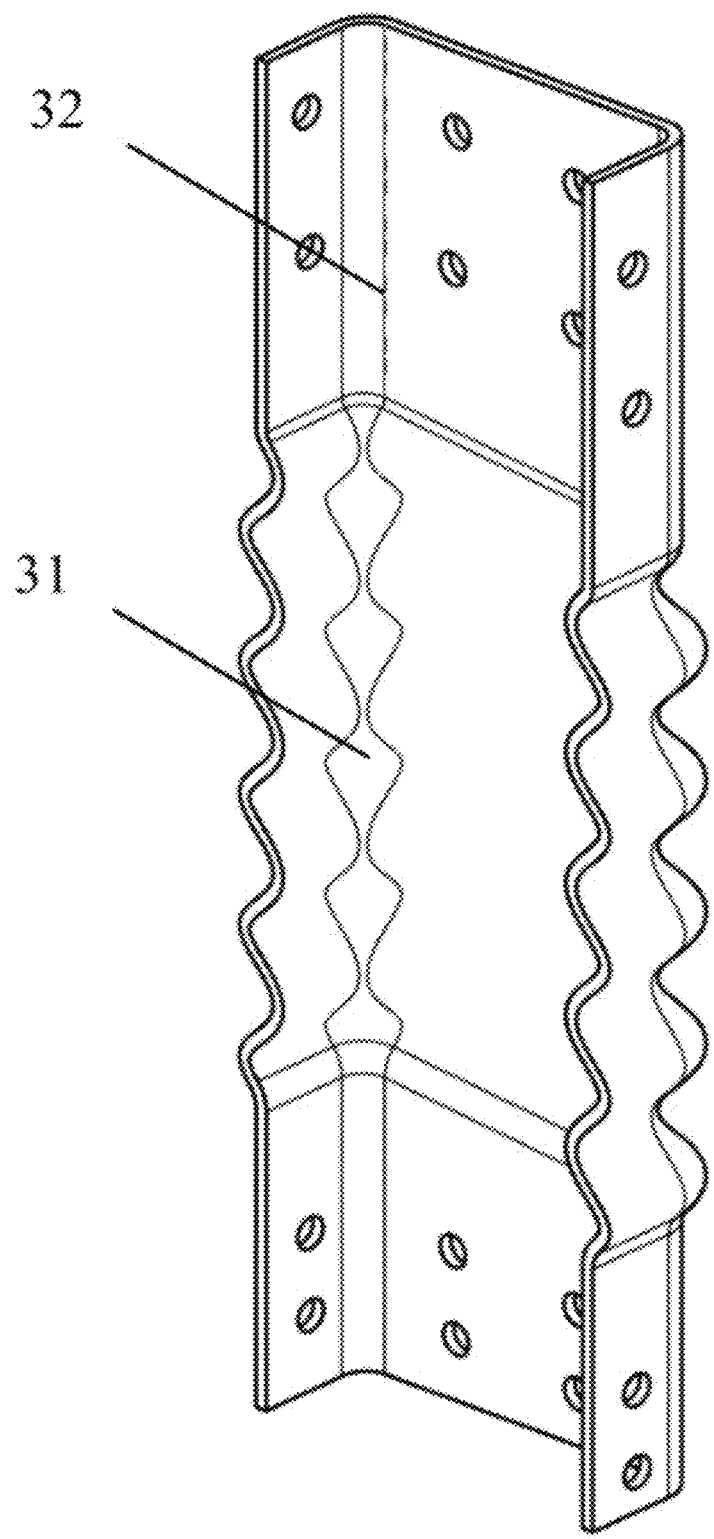
FIG. 3 is a three-dimensional view of a corrugated C-channel of the present invention.

FIG. 3 is a three-dimensional view of a corrugated C-channel of the embodiment, the corrugated C-channel 3 includes a corrugated section 31 and a straight section 32 arranged at both ends of the corrugated section 31, the corrugated section 31 and straight section 32 are on a straight line, the straight section 32 is integrated with the web plate and flange of the corrugated section 31, and the corrugation of the corrugated section 31 is arranged along its length extension direction, the corrugated section 31 can collapse along its length direction when compressed.

In the embodiment, the corrugated C-channel absorbs energy in the form of collapse deformation, and makes full use of most of the area of the column components to absorb energy, so as to ensure that the column components maintain a certain load capacity after components deformation, and the energy absorption efficiency is higher and the effect is more stable.

Figure 4:
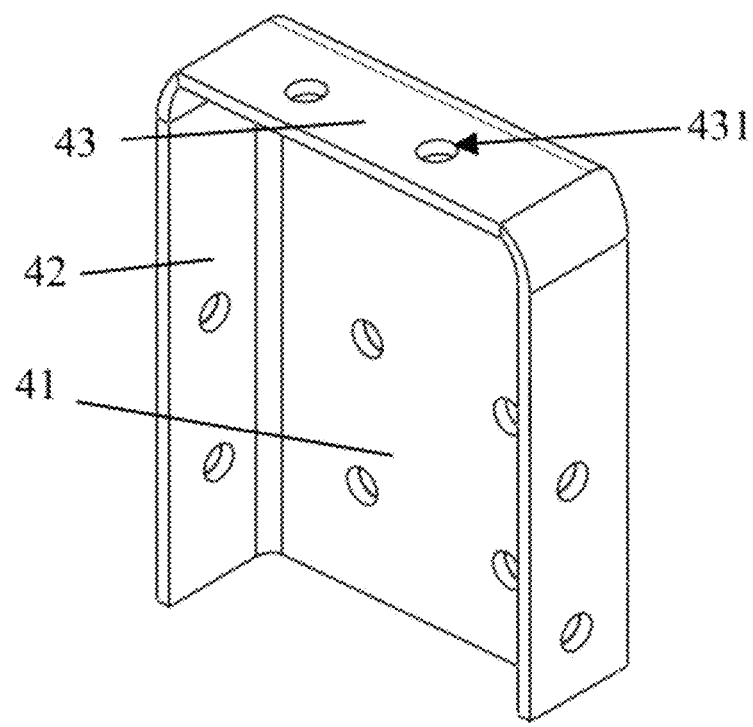
FIG. 4 is a three-dimensional view of a stanchion fitting of the present invention.

FIG. 4 is a three-dimensional view of a stanchion fitting of the embodiment, preferably, the stanchion fitting 4 includes the stanchion fitting main web plate 41, the two sides of the stanchion fitting main web plate 41 are connected to the stanchion fitting flange 42, and the stanchion fitting secondary web plate 43 is located at one end of the stanchion fitting main web plate 41, the stanchion fitting main web plate 41, the stanchion fitting flange 42 and the stanchion fitting secondary web plate 43 are fixedly connected and perpendicular to each other.

As a further optimization scheme, in the disclosed embodiment, preferably, multiple fifth bolt holes 431 are arranged on the stanchion fitting secondary web plate 43, and the stanchion fitting secondary web plate is fixedly connected to the upper flange of the cargo floor crossbeam 12 and the lower flange of the lower curved fuselage frame 2 by bolts through the fifth bolt hole 431 respectively, to ensure the stability of the connection between the column component and the fuselage sub-floor structure, and to prevent the column component from invading the cabin structure after the failure of the connection between the column component and the cargo floor crossbeam 12 at the same time.

Figure 5:
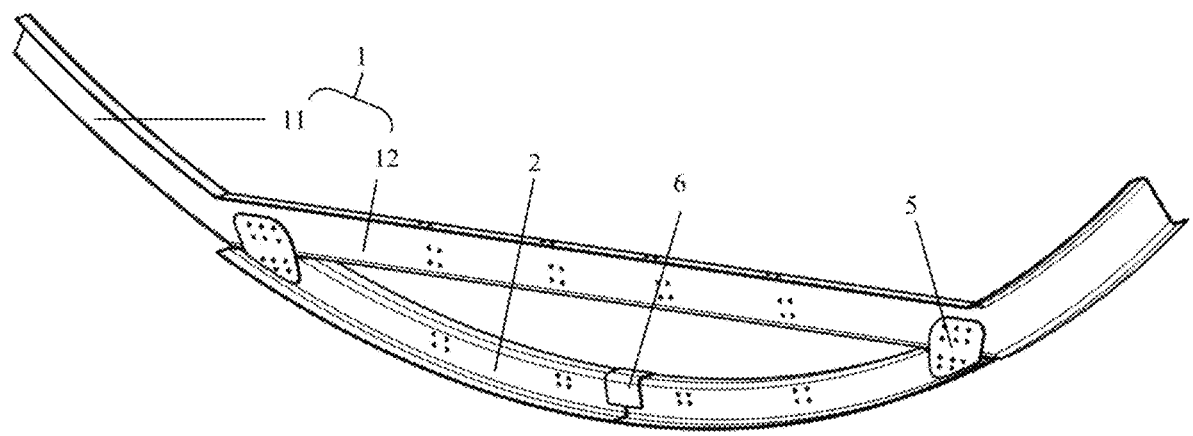
FIG. 5 is a schematic diagram of the connection between the upper fuselage frame and the lower curved fuselage frame, and the docking of the lower curved fuselage frame of the present invention.

FIG. 5 is a schematic diagram of the connection between the upper fuselage frame and the lower curved fuselage frame, and the docking of the lower curved fuselage frame of the embodiment, the existing aircraft fuselage frame structure is integrated, and there is no division of the upper and lower frame structure, the cargo floor crossbeam 12 is taken as the boundary in the embodiment, and the frame structure which includes and above the cargo floor crossbeam is divided into the upper curved fuselage frame 11, and the frame structure below the cargo floor crossbeam 12 is divided into the lower curved fuselage frame 2, further, the plane where the central axis of the aircraft and the rolling axis are located as the boundary to divide the lower curved fuselage frame 2 into two section structures. Therefore, the frame is divided into three separate structures, and the structures are connected by the splice plate 5, the doubler 6, and the aircraft fuselage column component.

In the embodiment, the longitudinal sections of the upper fuselage frame 1 and the lower curved fuselage frame 2 along the length direction of the fuselage are Z-shaped, and the web plate width of the upper fuselage frame 1 is larger than that of the lower curved fuselage frame 2. The web plate of the upper fuselage frame 1 and the web plate of the lower curved fuselage frame 2 are fixedly connected to the splice plate 5 respectively, so that the upper fuselage frame 1 and the lower curved fuselage frame 2 can form a detachable whole, the splice plate 5 and the connection method will not fail in the event of a crash. Further, the two sections of the lower curved fuselage frame 2 are fixedly connected to the doubler 6 respectively, and the connection is sunk into the interior of the cabin in the event of a crash to ensure that the middle section of the lower curved fuselage frame 2 forms a plastic hinge.

The above disclosure is only a preferred embodiment of the present invention, it is not intended that the embodiments be limited thereto, as variations may occur to those skilled in the art without departing from the scope of the present invention.

What is claimed is:

1. An aircraft column component, comprising: a corrugated C-channel, an upper stanchion fitting and a lower stanchion fitting, wherein the aircraft column component is configured to be connected between a cargo floor crossbeam of an upper fuselage frame of an aircraft and a lower curved fuselage frame of the aircraft;

the corrugated C-channel comprises an intermediate corrugated section and a straight section arranged at both ends of the corrugated C-channel, wherein each straight section of the corrugated C-channel is integrated with a web plate and a flange of the intermediate corrugated section, and a corrugation of the intermediate corrugated section is arranged along a length extension direction of the intermediate corrugated section; and each of the upper stanchion fitting and the lower stanchion fitting comprises a stanchion fitting main web plate, a stanchion fitting flange and a stanchion fitting secondary web plate, wherein the stanchion fitting main web plate, the stanchion fitting flange and the stanchion fitting secondary web plate are fixedly connected and perpendicular to each other;

wherein the upper stanchion fitting and the lower stanchion fitting are connected to an inner side of the straight section respectively, the stanchion fitting main web plate of the upper stanchion fitting is connected to the cargo floor crossbeam, the stanchion fitting main web plate of the lower stanchion fitting is connected to the lower curved fuselage frame, the stanchion fitting main web plate of the upper stanchion fitting is fixedly connected to the web plate of a straight section arranged at one end of the both ends of the corrugated C-channel, the stanchion fitting flange of the upper stanchion fitting is fixedly connected to a flange of the straight section arranged at the one end of the both ends of the corrugated C-channel, the stanchion fitting main web plate of the lower stanchion fitting is fixedly connected to the web plate of a straight section arranged at another end of the both ends of the corrugated C-channel, and the stanchion fitting flange of the lower stanchion fitting is fixedly connected to a flange of the straight section arranged at the another end of the both ends of the corrugated C-channel.

2. The aircraft column component according to claim 1, wherein a strength of each of the upper stanchion fitting and the lower stanchion fitting is greater than a strength of the corrugated C-channel.

3. An aircraft fuselage sub-floor structure, comprising: an upper fuselage frame, a lower curved fuselage frame, and the aircraft column component according to claim 1, wherein the aircraft column component is connected between the upper fuselage frame and the lower curved fuselage frame.

4. The aircraft fuselage sub-floor structure according to claim 3, wherein the upper fuselage frame comprises an upper curved fuselage frame and a cargo floor crossbeam; wherein the upper curved fuselage frame is integrated with the cargo floor crossbeam.

5. The aircraft fuselage sub-floor structure according to claim 4, further comprising two splice plates are arranged between two ends of the lower curved fuselage frame and the cargo floor crossbeam, one of the two splice plates is detachably and fixedly connected to one end of the lower curved fuselage frame and the cargo floor crossbeam, and an other one of the two splice plates is detachably and fixedly connected to an other end of the lower curved fuselage frame and the cargo floor crossbeam.

6. The aircraft fuselage sub-floor structure according to claim 5, wherein a strength of the two splice plates is greater than a strength of the upper fuselage frame.

7. The aircraft fuselage sub-floor structure according to claim 3, wherein a first end of the corrugated C-channel of the aircraft column component is fixedly connected to the cargo floor crossbeam, and a second end of the corrugated C-channel is tilted downward and fixedly connected to the lower curved fuselage frame.

* * * * *